(12) United States Patent
Moos et al.

(10) Patent No.: US 10,539,060 B2
(45) Date of Patent: Jan. 21, 2020

(54) ON-BOARD DIAGNOSTICS FOR AN EXHAUST GAS CATALYTIC CONVERTER AND DETECTION OF AGING

(71) Applicant: CPT Group GmbH, Hannover (DE)

(72) Inventors: Ralf Moos, Bayreuth (DE); Willibald Reitmeier, Hemau (DE); Markus Dietrich, Regensburg (DE); Denny Schädlich, Neustadt (DE); Markus Hien, Bruck (DE); Katharina Burger, Regensburg (DE)

(73) Assignee: CPT GROUP GMBH, Hannover (DE)

( * ) Notice: Subject to any disclaimer, the term of this patent is extended or adjusted under 35 U.S.C. 154(b) by 0 days.

(21) Appl. No.: 16/338,488

(22) PCT Filed: Aug. 2, 2017

(86) PCT No.: PCT/EP2017/069552
§ 371 (c)(1),
(2) Date: Mar. 31, 2019

(87) PCT Pub. No.: WO2018/065141
PCT Pub. Date: Apr. 12, 2018

(65) Prior Publication Data
US 2019/0226382 A1    Jul. 25, 2019

(30) Foreign Application Priority Data
Oct. 7, 2016 (DE) .................. 10 2016 219 555

(51) Int. Cl.
*F01N 11/00* (2006.01)
*F01N 3/20* (2006.01)
(Continued)

(52) U.S. Cl.
CPC .......... *F01N 11/00* (2013.01); *B01D 53/9431* (2013.01); *B01D 53/9495* (2013.01);
(Continued)

(58) Field of Classification Search
CPC . F01N 3/208; F01N 11/00; F01N 9/00; F01N 2550/02; F01N 2560/026; B01D 53/9431; B01D 53/9495
(Continued)

(56) References Cited

U.S. PATENT DOCUMENTS 9,010,087 B1 * 4/2015 Upadhyay ............... F01N 11/00
                                                            60/277
9,435,244 B1    9/2016 Devarakonda
(Continued)

FOREIGN PATENT DOCUMENTS

DE    102015001231 A1    8/1916    ............. F01N 11/00
DE    19916677 C1         1/2001    ............. B01D 53/04
(Continued)

OTHER PUBLICATIONS

California Code of Regulations, "1971.1. On-Board Diagnostic System Requirements—2010 and Subsequent Model-Year Heavy-Duty Engines" Oxides of Nitrogen (NOx) Converting Catalyst Monitoring, 2 pages, Retrieved on Apr. 11, 2015.
(Continued)

*Primary Examiner* — Tom P Duong
(74) *Attorney, Agent, or Firm* — Slayden Grubert Beard PLLC

(57) ABSTRACT

Various embodiments include a catalyst measuring system for on-board diagnostics and for determining the aging of an SCR catalytic converter for a vehicle comprising: a processor; an SCR catalytic converter for purifying exhaust gas of the vehicle; a high-frequency sensor for determining the ammonia loading of the SCR catalytic converter; a NOx sensor for sensing the NOx concentration downstream of the SCR catalytic converter; and an ammonia dosing system for injecting ammonia into an exhaust system of the vehicle. The control device instructs the ammonia dosing system to
(Continued)

inject ammonia selectively into the exhaust system at a plurality of different dosing rates. The control device evaluates data received from the NOx sensor and of the high-frequency sensor to calculate the ammonia dosing rate.

13 Claims, 3 Drawing Sheets

(51) Int. Cl.
*B01D 53/94* (2006.01)
*F01N 9/00* (2006.01)
*G07C 5/08* (2006.01)

(52) U.S. Cl.
CPC .............. *F01N 3/208* (2013.01); *F01N 9/00* (2013.01); *G07C 5/0808* (2013.01); *F01N 2550/02* (2013.01); *F01N 2560/026* (2013.01); *F01N 2560/12* (2013.01); *F01N 2610/02* (2013.01); *F01N 2900/1402* (2013.01)

(58) Field of Classification Search
USPC .................................. 422/168; 60/274, 286
See application file for complete search history.

(56) References Cited

U.S. PATENT DOCUMENTS

| | | | |
|---|---|---|---|
| 9,540,984 B2 | 1/2017 | Roesch et al. | |
| 9,790,835 B1* | 10/2017 | Wu | ................ F01N 11/007 |
| 2008/0022658 A1 | 1/2008 | Viola et al. | ................ 60/286 |
| 2009/0272101 A1* | 11/2009 | Wills | ................ B01D 53/9431 |
| | | | 60/286 |
| 2010/0024393 A1* | 2/2010 | Chi | ................ F01N 3/106 |
| | | | 60/276 |
| 2011/0265452 A1* | 11/2011 | Geveci | ................ F01N 3/208 |
| | | | 60/274 |
| 2014/0020364 A1* | 1/2014 | Wittrock | ................ F01N 3/10 |
| | | | 60/274 |
| 2014/0314645 A1* | 10/2014 | Ofoli | ................ B01D 53/90 |
| | | | 423/212 |
| 2014/0360166 A1* | 12/2014 | Chandrasekaran | ..... F01N 11/00 |
| | | | 60/274 |
| 2015/0113962 A1* | 4/2015 | Devarakonda | ............ F01N 3/18 |
| | | | 60/286 |
| 2015/0328586 A1* | 11/2015 | Zeng | ................ B01D 53/9495 |
| | | | 423/212 |
| 2016/0201535 A1* | 7/2016 | Pokharel | ................ F01N 3/208 |
| | | | 701/102 |
| 2016/0279574 A1* | 9/2016 | Devarakonda | ..... B01D 53/9409 |
| 2017/0044963 A1 | 2/2017 | Wehler et al. | ............ 423/213.2 |
| 2017/0122159 A1* | 5/2017 | Bahrami | ................ F01N 3/103 |

FOREIGN PATENT DOCUMENTS

| | | | |
|---|---|---|---|
| DE | 10358495 A1 | 7/2005 | ............ F01N 11/00 |
| DE | 102008012050 A1 | 9/2009 | ............ F01N 11/00 |
| DE | 102010034983 A1 | 2/2012 | ............ F01N 11/00 |
| DE | 102011107784 B4 | 3/2014 | ............ F01N 11/00 |
| DE | 102014208095 A1 | 10/2015 | ............ F01N 11/00 |
| EP | 3073082 A1 | 9/1916 | ............ F01N 11/00 |
| WO | 2018/065141 A1 | 4/1918 | ............ F01N 11/00 |
| WO | 2018/068994 A1 | 4/1918 | ............ F01N 11/00 |
| WO | 2015/090342 A1 | 6/2015 | ............ F01N 11/00 |

OTHER PUBLICATIONS

German Office Action, Application No. 102016219555.7, 9 pages, dated May 30, 2017.
German Office Action, Application No. 102016219646.4, 9 pages, dated Jun. 2, 2017.
International Search Report and Written Opinion, Application No. PCT/EP2017/069552, 13 pages, dated Sep. 15, 2017.
International Search Report and Written Opinion, Application No. PCT/EP2017/073495, 17 pages, dated Nov. 24, 2017.
"Selective Catalytic Reduction," Wikipedia, URL: https://de.wikipedia.org/w/index.php?title=Selektive_katalytische_Reduktion, 7 pages, Retrieved on Apr. 2, 2019.

* cited by examiner

Figure 3: Illustration of the method 401   402   403   404   405   406

US 10,539,060 B2

ON-BOARD DIAGNOSTICS FOR AN EXHAUST GAS CATALYTIC CONVERTER AND DETECTION OF AGING

CROSS-REFERENCE TO RELATED APPLICATIONS

This application is a U.S. National Stage Application of International Application No. PCT/EP2017/069552 filed Aug. 2, 2017, which designates the United States of America, and claims priority to DE Application No. 10 2016 219 555.7 filed Oct. 7, 2016, the contents of which are hereby incorporated by reference in their entirety.

TECHNICAL FIELD

The present disclosure relates to passenger vehicles. Various embodiments of the teachings herein may include systems and methods for on-board diagnostics for an exhaust gas catalytic converter.

BACKGROUND

Passenger cars or trucks which are operated with internal combustion engines have become a permanent part of modern society. The automobile industry is aiming to develop vehicles which are distinguished by low emissions of pollutants and at the same time can be manufactured in a cost-effective manner. In particular, at present, development work is centred on nitrogen oxide reduction technologies. Therefore, new methods for exhaust gas purification are being developed in order to reduce the concentration of nitrogen oxide (NOx) in exhaust gases. One method is to use an ammonia SCR system. This system is used, in particular, for lowering the NOx emissions of both trucks and passenger cars.

In some SCR systems, a urea solution is injected as a reducing agent into the exhaust system of the vehicle. This liquid reducing agent is vaporized in the exhaust system and is ultimately converted into gaseous ammonia (NH3). With the aid of this ammonia, the noxious nitrogen oxides NOx are converted into nitrogen N2 and water H2O in the ammonia SCR catalytic converter. So that the ammonia SCR reaction can take place, ammonia must be firstly adsorbed, that is to say stored in the SCR catalytic converter. The conversion of NOx can depend to a great extent on the quantity of stored ammonia, in particular at low catalyst temperatures.

SUMMARY

The teachings of the present disclosure describe methods and systems intended to decrease the NOx emissions of a vehicle. For example, some embodiments include a catalyst measuring system (100) for on-board diagnostics and for determining the aging of an SCR catalytic converter (110) for a vehicle, having: a control device (120) for controlling the catalyst measuring system (100) and for evaluating the measurement data, an SCR catalytic converter (110) for purifying the exhaust gas of the vehicle, a high-frequency measuring arrangement (130) for determining the ammonia loading of the SCR catalytic converter (110), an NOx sensor arrangement (150) for sensing the NOx concentration downstream of the SCR catalytic converter (110), and an ammonia dosing system (140) for injecting ammonia into the exhaust system (220) of the vehicle, wherein the control device (120) is designed to instruct the ammonia dosing system (140) to inject ammonia selectively into the exhaust system (220) at different dosing rates, and wherein the control device (120) is designed to evaluate the measured data of the NOx sensor arrangement (150) and of the high-frequency measuring arrangement (130) and to calculate the coming ammonia dosing rate therefrom.

In some embodiments, the control device (120) is designed to instruct the ammonia dosing system (140) to inject the highest possible dosing rate of ammonia which still does not bring about ammonia loading of the SCR catalytic converter (110).

In some embodiments, the highest possible dosing rate is characterized in that the exhaust gas has a minimal NOx concentration downstream of the SCR catalytic converter (110) without ammonia being deposited in the SCR catalytic converter (110).

In some embodiments, the highest possible dosing rate is characterized in that the exhaust gas has a minimal NOx concentration downstream of the SCR catalytic converter (110) with ammonia being deposited only once in the SCR catalytic converter (110).

In some embodiments, the control device (120) is designed to compare the measured data of the NOx sensor arrangement (150) and of the high-frequency measuring arrangement (130) at the previous and current dosing rates.

In some embodiments, the control device (120) is designed to determine the highest possible dosing rate in an iterative method.

In some embodiments, the high-frequency measuring arrangement (130) is designed to measure the resonance frequency of the SCR catalytic converter (110).

In some embodiments, the high-frequency measuring arrangement (130) is designed to measure the dielectric losses in the SCR catalytic converter (110).

In some embodiments, the control device (120) is designed to determine the state of aging of the SCR catalytic converter (110) from the measured NOx concentration and/or the measured ammonia loading.

As another example, some embodiments include a vehicle (500) having an SCR catalytic converter (110) and a catalyst measuring system (100) as described above for determining a highest possible dosing rate of ammonia which brings about a greatest possible reduction in the NOx concentration in the exhaust gas without ammonia being deposited in the SCR catalytic converter (110).

As another example, some embodiments include a vehicle (500) having an SCR catalytic converter (110) and a catalyst measuring system (100) as described above for determining a highest possible dosing rate of ammonia which brings about a greatest possible reduction in the NOx concentration in the exhaust gas with the result that only a minimal amount of ammonia is deposited in the SCR catalytic converter (110).

As another example, some embodiments include a method for on-board diagnostics and for determining the state of aging of an SCR catalytic converter, having the following steps: determining (401) the NOx concentration during dosed ammonia injection of an SCR catalytic converter as a reference; initializing (402) the measurement by operating the SCR catalytic converter at a constant operating point without ammonia injection, with the result that no or very little ammonia is stored in the SCR catalytic converter; injecting (403) ammonia into the exhaust system according to a defined dosing rate; measuring (404) the NOx concentration downstream of the SCR catalytic converter and the ammonia loading of the SCR catalytic converter; determining (405) the highest possible ammonia dosing rate at which the NOx concentration downstream of the SCR catalytic converter becomes minimal without ammonia loading occurring, or with only minimal ammonia loading occurring, in the SCR catalytic converter; and determining (406) the state of aging of the SCR catalytic converter taking into account the highest possible dosing rate.

BRIEF DESCRIPTION OF THE DRAWINGS

Further features, advantages, and possible uses of the teachings herein emerge from the following description of the exemplary embodiments and figures. The figures are schematic and are not true to scale. If the same reference signs are stated in the following description in various figures, they denote identical or similar elements.

DETAILED DESCRIPTION

Figure 1:
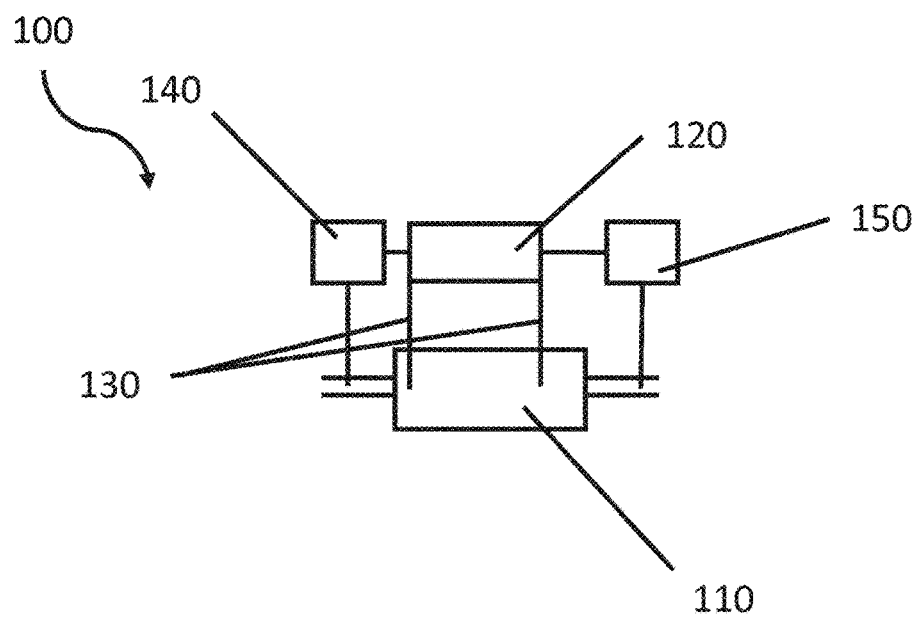
FIG. 1 shows a schematic illustration of a catalyst measuring system incorporating teachings of the present disclosure.

Some embodiments include a catalyst measuring system for on-board diagnostics and for determining the aging of an SCR catalytic converter for a vehicle. The catalyst measuring system has the following components: a control device for controlling the catalyst measuring system and for evaluating the measurement data, an SCR catalytic converter for purifying the exhaust gases of a vehicle, a high-frequency measuring arrangement for determining the ammonia loading of an SCR catalytic converter, an NOx sensor arrangement for sensing the NOx concentration downstream of the SCR catalytic converter and an ammonia dosing system for injecting ammonia into the exhaust system of the vehicle. The control device is designed to instruct the ammonia dosing system to inject ammonia selectively into the exhaust system at different dosing rates. The control device is also designed to evaluate the measured data of the NOx sensor arrangement and of the high-frequency measuring arrangement and to calculate the coming ammonia dosing rate therefrom, that is to say, for example, to calculate the ammonia dosing rate to be used next.

In some embodiments, the catalyst measuring system includes an SCR catalytic converter which is free of ammonia at the start of the measuring process and is at a defined, stable operating point. A defined, stable operating point can be present when there is a constant temperature, when there is a constant volume flow of exhaust gas and/or when there is a constant EGR rate (exhaust gas recirculation rate). The ammonia dosing of the ammonia dosing system can be switched off for this. The catalyst measuring system can be operated without the dosing of ammonia until the high-frequency measuring arrangement detects a constant value for the ammonia loading. The high-frequency measuring arrangement can input electromagnetic waves into the exhaust train via, for example, small coupling elements, e.g. antennas, and measure the reflection or the transmission of the emitted electromagnetic waves. The electromagnetic waves correlate with the state of loading of the SCR catalytic converter. The metallic catalytic converter housing constitutes an electrical cavity resonator here.

One or two simple antennas, for example, coaxial pin couplers or loop couplers which are introduced into the catalytic converter housing, can serve as sensors. The di/electric properties of the SCR catalytic converter are determined by its ceramic honeycomb body, incl. the coating and the storage material and can be measured by means of the high-frequency measuring arrangement.

In exhaust gas catalytic converters, the changing of the resonance behaviour, for example the resonance frequency which is obtained from the reflection coefficients, can be used as a signal feature. In some embodiments, the transmission can be used as a signal feature, but this requires two antennas. If high-frequency electromagnetic waves are input into a cavity resonator by means of an antenna, a plurality of standing waves, which are referred to as modes, are formed in the latter. Each mode has a separate oscillation pattern at the respective resonance frequency. These pronounced resonance points change their frequency and attenuation as a function of the state of loading of the SCR catalytic converter. It can therefore be possible to measure the ammonia loading of the SCR catalytic converter using this high-frequency measuring arrangement.

In some embodiments, for the on-board diagnostics and the detection of aging, ammonia can be injected into the exhaust system of the vehicle at selected dosing rates which are varied. The term "dosing rate" is to be understood here as both the actual feed rate and the duration of the feeding, with the result that the dosing rate corresponds to a fed-in quantity of ammonia. The reaction of the SCR system to the selective dosing rates is measured by means of the high-frequency measuring arrangement and the NOx sensor arrangement.

In some embodiments, the NOx sensor arrangement can measure the NOx concentration in the exhaust gas downstream of the SCR catalytic converter. In this context, the effect of injecting ammonia can be seen immediately from the reduction in NOx in the exhaust gas. The high-frequency measuring arrangement can measure the ammonia loading of the SCR catalytic converter. Both measurement parameters of the high-frequency measuring arrangement, the resonance frequency and the dielectric losses exhibit a direct correlation with the stored ammonia in the SCR catalytic converter. As soon as storage of ammonia in the SCR catalytic converter takes place as a result of an injected dosing rate, it can be assumed that the injected ammonia dosing rate was too high and the entire injected ammonia was not used for the NOx conversion.

In some embodiments, the systems and/or methods determine the maximum possible dosing rate possible without resulting in ammonia loading of the SCR catalytic converter and adapt the actual dosing rate as a function of the state of aging of the SCR catalytic converter, by means of an iterative process. For example, if a reduction in the NOx concentration, but still no storage in the SCR catalytic converter, is apparent as result of the first dosing rate, the control device can implement the second dosing rate with a larger quantity of ammonia. If a decrease in the NOx concentration is again apparent as result of the second dosing rate, but a rise in stored ammonia in the SCR catalytic converter is also apparent, it can be assumed that the quantity of ammonia of the second dosing rate was too high. As an alternative to ammonia, an ammonia-generating substance such as e.g. urea or a urea solution (HWL) can be injected or dosed into the exhaust system of the vehicle. Both alternatives can be used in conjunction with an SCR catalytic converter in order to reduce NOx emissions in the exhaust gases of a vehicle.

In some embodiments, from the acquired data, the control device can calculate the coming dosing rate which has a quantity of ammonia between the first and the second dosing rates. The process can be repeated until the highest possible dosing rate has been found without ammonia being deposited in the SCR catalytic converter. The highest possible dosing rate is distinguished by the fact that the NOx concentration downstream of the SCR catalytic converter becomes minimal and no more ammonia, or only a minimal amount of ammonia, is stored in the SCR catalytic converter. The highest possible dosing rate is also referred to as the stoichiometric point at which the entire ammonia reacts with the NOx with the result that a minimal NOx concentration occurs in the exhaust gas downstream of the SCR catalytic converter. If the catalytic converter has aged, the catalytic effect and storage capacity thereof decrease.

Conversely, the storage capacity is therefore a measure of the NOx conversion rate. The highest possible dosing rate changes as result of the aged SCR catalytic converter. Therefore, the state of aging of the SCR catalytic converter can also be inferred on the basis of the changed highest possible dosing rate. The ammonia loading of the SCR catalytic converter is apparent from the two measurement parameters of the high-frequency measuring arrangement. The system can be designed to carry out detection of aging at specific, for example regular, intervals, and the state of aging of the catalytic converter can therefore be monitored. A NOx sensor for detecting aging can be provided for the catalyst measuring system in order to detect the minimal NOx concentration downstream of the SCR catalytic converter. The entire emptying and the reaction of the SCR catalytic converter to the selective dosing rates can be determined independently by the catalyst measuring system at the preferably constant operating points. In some embodiments, the determination of aging by the catalyst measuring system can also be carried out in the transient mode of the SCR catalytic converter, that is to say while the vehicle is traveling.

Such high-frequency measuring systems are in principle also suitable for determining the oxygen loading of the three-way catalytic converters, lean NOx traps (LNT), diesel oxidation catalytic converters (DOC) or for the measurement of the soot loading of particle filters. Therefore, the system which is described above and below can also be applied in these catalytic converters/particle filters.

In some embodiments, the ammonia dosing system comprises an injection nozzle for injecting ammonia into the exhaust system, a reservoir tank for the ammonia, a pump, a heating system for the reservoir tank and the lines. In addition, the ammonia dosing system can also have further components. In some embodiments, the ammonia dosing system sets the highest possible dosing rate of ammonia which does not yet bring about ammonia loading of the SCR catalytic converter.

The SCR catalytic converter can be freed completely of ammonia at the start of the measurement of aging, and therefore no further ammonia can be stored in the SCR catalytic converter. As soon as the SCR catalytic converter is freed of ammonia, the ammonia dosing system can inject selected ammonia dosing rates into the exhaust system, with the result that the reaction of the SCR catalytic converter to the selected dosing rates can be measured. The NOx concentration downstream of the SCR catalytic converter and the ammonia loading of the SCR catalytic converter can be used as measured values. The NOx concentration can be determined by the NOx sensor arrangement, and the ammonia loading of the SCR catalytic converter can be determined by the high-frequency measuring arrangement.

In some embodiments, the highest possible dosing rate is characterized in that the exhaust gas has a minimal NOx concentration downstream of the SCR catalytic converter without ammonia being deposited in the SCR catalytic converter. The highest possible dosing rate which is to be injected by the ammonia dosing system can be described by two significant points. The first point is the minimal NOx concentration in the exhaust train, and the second point is that no ammonia loading, or only a minimal ammonia loading, of the SCR catalytic converter takes place. Therefore, a highest possible reduction of NOx in the exhaust gases can be ensured and at the same time overdosage of ammonia can be prevented. Therefore, the ammonia consumption can be minimized and the customer does not have to top up the ammonia as often.

In some embodiments, the highest possible dosing rate is characterized in that the exhaust gas has a minimal NOx concentration downstream of the SCR catalytic converter with the result that only a minimal amount of ammonia is deposited in the SCR catalytic converter.

In some embodiments, the control device is designed to compare the measured data of the NOx sensor arrangement and that of the high-frequency measuring arrangement at the preceding and the current ammonia dosing rates. The control device can compare the current dosing rate and the reaction of the SCR system thereto with the preceding dosing rates and the subsequent reactions of the system. The ammonia dosing system injects a first dosing rate, and the reaction of the SCR system to the injected quantity of ammonia can be recorded by the NOx sensor arrangement and the high-frequency measuring arrangement. The preceding dosing rates and the reactions of the SCR system which have respectively occurred can be taken into account for the calculation of the coming dosing rate. For example, if no ammonia loading of the SCR catalytic converter occurred as result the first dosing rate, but ammonia loading did occur as a result the second dosing rate, the third dosing rate can have a quantity of ammonia between the two preceding dosing rates.

In some embodiments, the control device is designed to determine the highest possible dosing rate in an iterative method. In other words, the control device of the catalyst measuring system can adapt the dosing rates of ammonia after each injection which has taken place, until a sufficiently precise result can be ensured. This takes place in an iterative method. It can be provided that at least one dosing rate does not bring about ammonia loading in the SCR catalytic converter, and at least one dosing rate brings about ammonia loading in the SCR catalytic converter. The coming dosing rate has a quantity of ammonia which is between the two preceding dosing rates. The process can be repeated until the highest possible dosing rate which still does not bring about any ammonia loading in the SCR catalytic converter has been found.

In some embodiments, the high-frequency measuring arrangement measures the resonance frequency of the SCR catalytic converter in order to determine the ammonia loading of the SCR catalytic converter. The resonance frequency of the SCR catalytic converter changes as a function of the quantity of stored ammonia in the SCR catalytic converter. If ammonia cannot be absorbed any more by the SCR catalytic converter, the resonance frequency remains constant. The resonance frequency is also constant if the SCR catalytic converter is empty. As soon as ammonia is stored in the SCR catalytic converter, the resonance frequency begins to change.

In some embodiments, the high-frequency measuring arrangement measures the dielectric losses of the SCR catalytic converter. The high-frequency measuring arrangement can also measure the dielectric losses of the SCR catalytic converter in order to determine the ammonia loading of the SCR catalytic converter. The dielectric losses of the SCR catalytic converter change as a function of the quantity of stored ammonia in the SCR catalytic converter. As soon as ammonia is stored in the SCR catalytic converter, the dielectric losses begin to change.

In some embodiments, the control device is designed to determine the state of aging of the SCR catalytic converter from the measured NOx concentration and/or the measured ammonia loading. In other words, the control device of the catalyst measuring system can compare the measured reaction to the different dosing rates and the resulting highest possible dosing rates with a typical behavior for an SCR catalytic converter. The state of aging of the SCR catalytic converter can be inferred from the highest possible dosing rate and the measured values of the NOx concentration and the ammonia loading of the SCR catalytic converter. The older the SCR catalytic converter, the lower its reactivity, and the highest possible dosing rate which does not bring about any ammonia loading in the SCR catalytic converter therefore drops.

In some embodiments, a vehicle includes an SCR catalytic converter and a catalyst measuring system, described above and below, for determining a highest possible dosing rate of ammonia which brings about a greatest possible reduction in the NOx concentration in the exhaust gas without ammonia being deposited in the SCR catalytic converter. A vehicle can be equipped with the catalyst measuring system in order to decrease the NOx emissions of the vehicle. The catalyst measuring system is installed so that a flawless method of functioning of the SCR catalytic converter can be ensured. The catalyst measuring system can determine the state of aging of the SCR catalytic converter and measure the stored quantity of ammonia in the SCR catalytic converter. On the basis of the individual dosing rates, the catalyst measuring system can adapt its control, with the result that a highest possible reduction in NOx emissions can be ensured without ammonia overdosage taking place. The vehicle can be a gasoline vehicle, diesel vehicle, or biofuel or synthetic fuel or gas vehicle. The invention can also be used in hybrid vehicles with an internal combustion engine.

In some embodiments, the vehicle comprises an SCR catalytic converter and a catalyst measuring system for determining a highest possible dosing rate of ammonia which brings about a greatest possible reduction in the NOx concentration in the exhaust gas with the result that only a minimal amount of ammonia is deposited in the SCR catalytic converter. The vehicle may comprise, for example, a motor vehicle, such as a car, a bus or a truck, or else also a rail vehicle, a ship, an aircraft such as a helicopter or an airplane.

In some embodiments, a method for on-board diagnostics and for determining the state of aging of an SCR catalytic converter, includes:

determining the NOx concentration during dosed ammonia injection of an SCR catalytic converter as a reference.

initializing the measurement by operating the SCR catalytic converter at a constant operating point without ammonia injection, with the result that no or only little ammonia is stored in the SCR catalytic converter.

injecting ammonia into the exhaust system according to a defined dosing rate.

measuring the NOx concentration downstream of the SCR catalytic converter and the ammonia loading of the SCR catalytic converter.

determining the highest possible ammonia dosing rate at which the NOx concentration downstream of the SCR catalytic converter becomes minimal without ammonia loading occurring, or with only minimal ammonia loading occurring, in the SCR catalytic converter.

determining the state of aging of the SCR catalytic converter taking into account the highest possible dosing rate.

In some embodiments, a method for on-board diagnostics and for determining the state of aging of an SCR catalytic converter includes: The reference parameters for later comparison can be generated at the start of the method. Either the behavior of an SCR catalytic converter in the new state or the last valid measurement can be used for this. Subsequently, the actual measurement of the SCR catalytic converter can be started, and a constant operating point of the SCR catalytic converter can preferably be adopted for this. At this constant operating point, the temperature, the volume flow and the EGR rate should be kept constant. Furthermore, in this phase ammonia is not injected into the exhaust system by the ammonia dosing system, with the result that the stored ammonia in the SCR catalytic converter reacts with the NOx from the exhaust gases. The SCR catalytic converter is therefore free of ammonia. Various operating points can also be stored for this and used for the method. In this context, the signal of the NOx sensor arrangement is required so that the NOx emissions can be measured for the respective operating point.

Since the catalytic converter is completely emptied, one NOx sensor arrangement downstream of the SCR catalytic converter is sufficient for this. By using the high-frequency measuring arrangement, which is a direct measure of the ammonia loading of the SCR catalytic converter, it is possible to find the highest possible ammonia dosing rate at which the entire ammonia reacts but ammonia is still not stored in the SCR catalytic converter, i.e. to find the stoichiometric dosing point. Knowledge about the stoichiometric dosing point is relevant insofar as it is a direct measure of the activity of the catalytic converter. When aging occurs, the latter decreases, as result of which ammonia is stored in the SCR catalytic converter even at relatively low dosing rates.

Possible reasons for this aging, are, for example, sintering effects in the coating or contamination of the catalytic centers. The ammonia dosing system then injects ammonia into the exhaust system at defined dosing rates. The reaction of the SCR system to the injected dosing rate is sensed by the NOx sensor arrangement and the high-frequency measuring arrangement. The control device calculates the coming dosing rate on the basis of the measured values. The methods described find the highest possible dosing rate which does not bring about storage, or only brings about minimal storage, of ammonia in the SCR catalytic converter. For this, a plurality of different dosing rates are input into the SCR system and in each case the reaction of the SCR system to the respective dosing rates is sensed. As a result of the plurality of dosing rates, the highest possible dating rate which does not bring about any storage of ammonia in the SCR catalytic converter can be found in an iterative process.

The state of aging of the SCR catalytic converter can be inferred on the basis of the determined highest possible dosing rate. As aging progresses, the reactivity and therefore the highest possible dosing rate without ammonia loading of the SCR catalytic converter decreases over time. The method which is described above and below can also be applied in the transient mode of the SCR catalytic converter.

In some embodiments, a method determines the catalytic activity of the coating and to detect its aging over the lifetime of the catalytic converter. The resonance frequency and the dielectric losses correlate directly to the ammonia loading on the surface of the catalytic converter. If this method is applied at regular intervals, the aging of the catalytic activity over the service life of the SCR catalytic converter can be determined by means of the highest possible dosing rate. Therefore, for example, the operating strategy can be adapted and the optimum operation of the catalytic converter can be ensured. Likewise, thermal regeneration of the SCR catalytic converter can also be initiated, in order, if appropriate, to eliminate reversible contamination effects. An assumed precondition is a functionally capable, fault-free ammonia dosing system. The stoichiometric dosing rates can be determined for different operating points, as a result of which it is possible to adapt the dosing strategy to the SCR catalytic converter and always to operate the SCR catalytic converter in its optimum operating window. For example, optimization to a minimum stored quantity with maximum conversion can therefore be possible.

In some embodiments, a program element, when executed by a control device for a catalyst measuring system, instructs the catalyst measuring system to carry out the method described in the context of the present invention. In some embodiments, a computer-readable medium, on which a computer program is stored, when executed by a control device for a catalyst measuring system, instructs the catalyst measuring system to carry out the method described. FIG. 1 shows a schematic illustration of a catalyst measuring system 100. In order to ensure the best possible conversion of the NOx, the system 100 determines the stored quantity of ammonia in the SCR catalytic converter 110. The ammonia loading can be calculated using models which are based on signals from a wide variety of sensors and actuators of the exhaust system. Furthermore, engine operating status data are input as an input variable into the models. Since the accuracy of the models is limited, and the parameters also change with time, an ammonia slip strategy can be applied. The problems arising here are, in particular, the inaccuracy of the model, since there is a fault chain of the individual components, e.g. in the engine controller, the temperature measurement, the sensor inaccuracies and the determination of the various actuator positions.

In order to counter the problems described above of indirect measurement and of the models, a direct measurement of the state of loading can be carried out using a high-frequency measuring arrangement 130 (HF measuring system), also referred to as a microwave method, in order to determine the ammonia loading of an SCR catalytic converter 110.

The catalyst measuring system 100 has an SCR catalytic converter 110, a control device 120, a high-frequency measuring arrangement 130, a NOx sensor arrangement 150 and an ammonia dosing system 140. The SCR catalytic converter 110 serves to purify the exhaust gas of a vehicle of noxious NOx emissions. In order to purify the exhaust gas of NOx emissions, ammonia is additionally required and is injected in liquid form into the exhaust system of the vehicle by the ammonia dosing system 140. The injected ammonia vaporizes and converts the NOx into nitrogen and water in the SCR catalytic converter 110.

The control device 120 serves to control the injection of the ammonia by the ammonia dosing system 140, and in addition the control device 120 monitors the state of aging of the SCR catalytic converter 110. The control device 110 can also be partially or completely a component of another control unit, such as e.g. the ECU. For the selective control and the determination of aging of the SCR catalytic converter, the control device 120 requires the current ammonia loading of the SCR catalytic converter 110 and the NOx concentration in the exhaust gas, and this is ensured by the high-frequency measuring arrangement 130 and by the NOx sensor arrangement 150. The high-frequency measuring arrangement 130 is able to measure the resonance frequency and the dielectric losses of the SCR catalytic converter. Both measured parameters change as a function of the quantity of the stored ammonia in the SCR catalytic converter. The NOx sensor 150 is able to measure the remaining NOx concentration in the exhaust gas. The control device 120 can determine the highest possible dosing rate of ammonia at which ammonia is still not stored in the SCR catalytic converter 110 from the measured parameters in an iterative method. The control device 120 can infer the state of aging of the SCR catalytic converter 110 from the determined highest possible dosing rates. As aging progresses, the highest possible dosing rate at which ammonia is not stored in the SCR catalytic converter 110 decreases.

Figure 2:
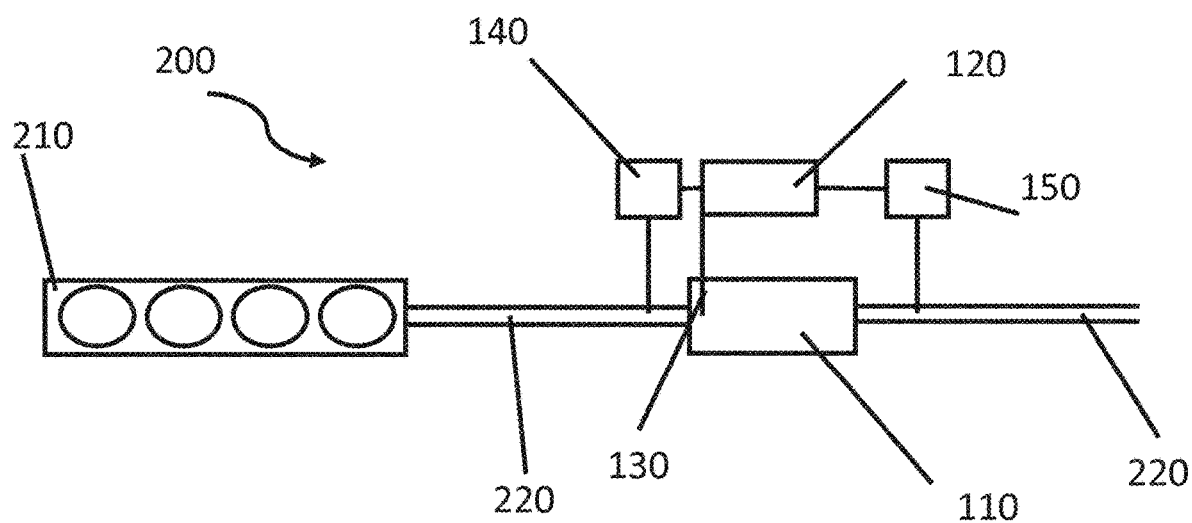
FIG. 2 shows a schematic illustration of a motor with an exhaust system and the catalyst measuring system incorporating teachings of the present disclosure.

FIG. 2 shows the catalyst measuring system 100 from FIG. 1 installed in an exhaust system 220 of a vehicle, wherein the catalyst measuring system 100 in the exemplary embodiment from FIG. 2 has an antenna for measuring the loading of the SCR catalytic converter 110. The internal combustion engine 210 generates energy and exhaust gases/particles when fuel is burnt. Inter alia, nitrogen oxides (NOx) occur as a component of the exhaust gases. The exhaust gases are discharged into the environment by the exhaust system 220. So that not all the noxious exhaust gases can pass into the environment, exhaust gas purification systems, such as e.g. an SCR catalytic converter 110, are installed in the exhaust system 220. Furthermore, the catalyst measuring system 100 is installed in the exhaust system 220 in order to monitor the aging of the SCR catalytic converter 110 and to optimize the control of the SCR catalytic converter 110.

Figure 3:
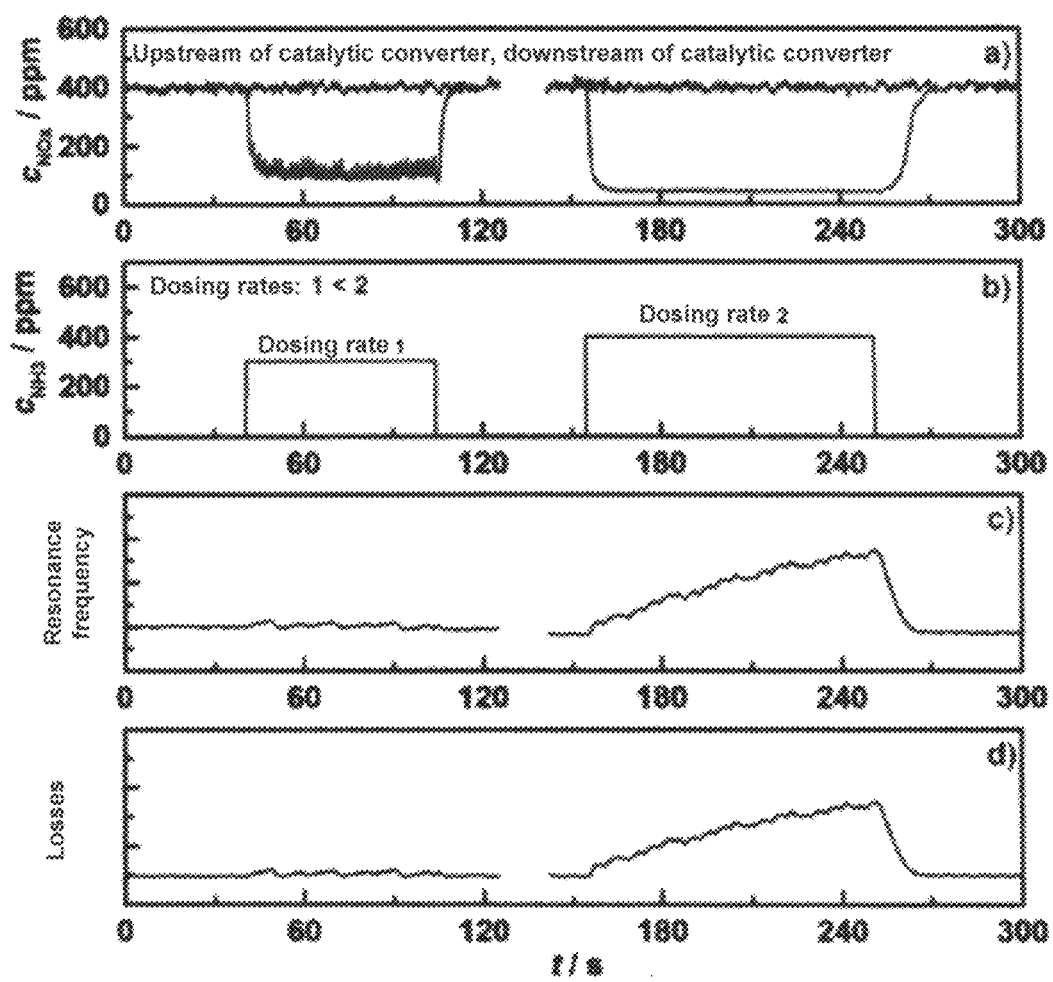
FIG. 3 shows a diagram in which the time profile of the NOx concentration, of the ammonia injection and of the ammonia loading of the SCR catalytic converter is illustrated.

FIG. 3 shows a diagram in which NOx concentration in the exhaust gas downstream of the SCR catalytic converter, the quantity of the injected ammonia at the respective dosing rates, the resonance frequency of the SCR catalytic converter and the dielectric losses of the SCR catalytic converter are plotted against the time. The two dosing rates 1 and 2 differ in their respective quantity of injected ammonia. The resonance frequency and the dielectric losses behave in a way which corresponds to the quantity of stored ammonia in the SCR catalytic converter. FIG. 3 shows two different dosing rates, wherein: rate 1<rate 2. At rate 1, the NOx conversion is approximately 75%, but ammonia is clearly still not being stored in the SCR catalytic converter. When rate 2 is used, detectable ammonia loading of the SCR catalytic converter occurs, as result of which it is clear that this dosing is over-stoichiometric. Likewise, the NOx conversion proceeds at a constant high value. If further dosing rates between rates 7 and 2 are adopted, a precisely stoichiometric dosing rate, that is to say the highest possible dosing rate without ammonia loading of the SCR catalytic converter, can be set with this method. Furthermore, it is apparent from the diagram that if the ammonia injection is stopped, the ammonia stored in the SCR catalytic converter is reduced and consumed.

Figure 4:
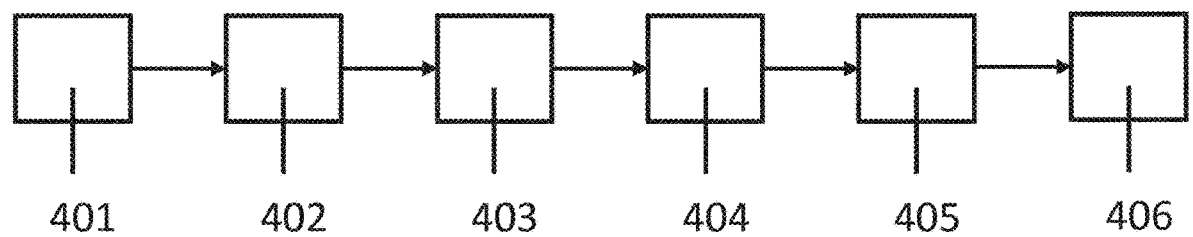
FIG. 4 shows a flowchart for a method for on-board diagnostics and for determining the aging of an SCR catalytic converter incorporating teachings of the present disclosure.

FIG. 4 shows a flow diagram for a method for determining the state of aging of an SCR catalytic converter. In step 401, the reference parameters are determined for a later comparison. For this reason, the reaction of the SCR system to a defined ammonia dosing rate is measured. The initialization of the measurement is carried out in step 402. Here, the SCR catalytic converter is operated at a constant operating point without ammonia injection, with the result that ideally no ammonia is stored any more, or only a small quantity of ammonia is stored, in the SCR catalytic converter. In step 403, the injection of ammonia takes place at defined dosing rates. In step 404, the measurement of the NOx concentration downstream of the SCR catalytic converter and the measurement of the ammonia loading of the SCR catalytic converter take place. The determination of the highest possible dosing rate at which ammonia is still not deposited in the SCR catalytic converter takes place in step 405. Finally, in step 406, the state of aging of the SCR catalytic converter is determined taking into account the highest possible dosing rate.

Figure 5:
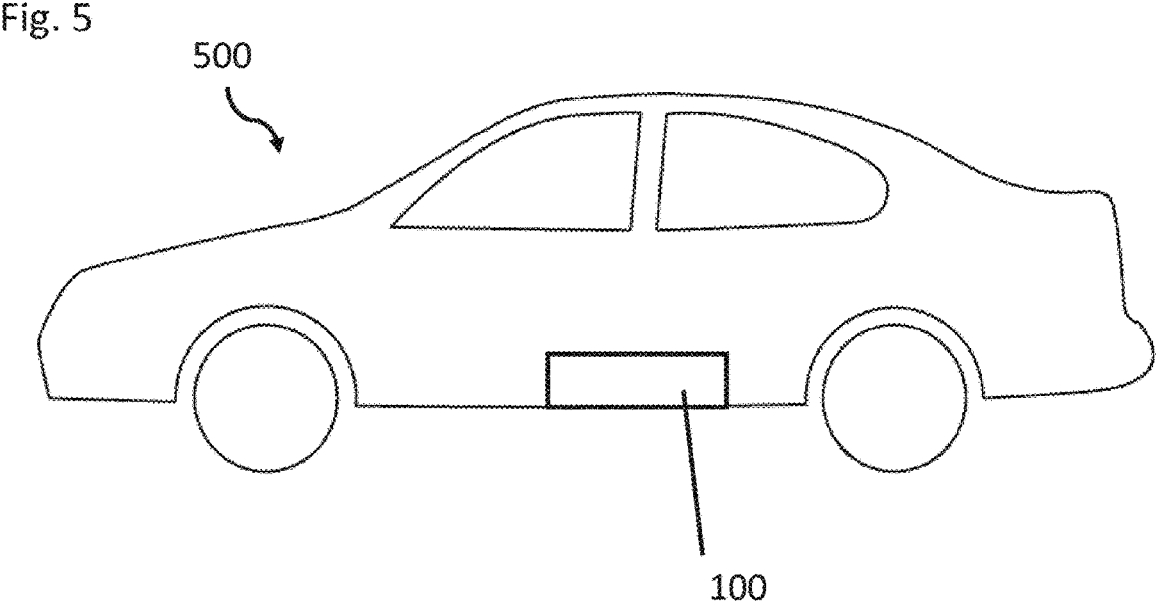
FIG. 5 exemplarily shows a vehicle having an installed catalyst measuring system incorporating teachings of the present disclosure.

FIG. 5 shows a vehicle 500 having a catalyst measuring system 100. The catalyst measuring system 100 serves for on-board diagnostics and for determining the state of aging of the SCR catalytic converter.

What is claimed is:

1. A catalyst measuring system for on-board diagnostics and for determining the aging of an SCR catalytic converter for a vehicle, the system comprising:
   an electronic control device for operating the catalyst measuring system and evaluating the measurement data;
   an SCR catalytic converter for purifying exhaust gas of the vehicle;
   a high-frequency sensor for determining the ammonia loading of the SCR catalytic converter;
   a NOx sensor for sensing the NOx concentration downstream of the SCR catalytic converter; and
   an ammonia dosing system for injecting ammonia into an exhaust system of the vehicle;
   wherein the electronic control device instructs the ammonia dosing system to inject ammonia selectively into the exhaust system at a plurality of different dosing rates; and
   the electronic control device evaluates data received from the NOx sensor and of the high-frequency sensor to calculate the ammonia dosing rate.

2. The catalyst measuring system as claimed in claim 1, wherein the electronic control device instructs the ammonia dosing system to inject the highest calculated dosing rate of ammonia which does not result in ammonia loading of the SCR catalytic converter.

3. The catalyst measuring system as claimed in claim 1, wherein the highest possible dosing rate is defined by a dosing rate having a minimal NOx concentration downstream of the SCR catalytic converter without ammonia being deposited in the SCR catalytic converter.

4. The catalyst measuring system as claimed in claim 1, wherein the highest possible dosing rate is defined as the dosing rate with a minimal NOx concentration downstream of the SCR catalytic converter resulting in ammonia being deposited only once in the SCR catalytic converter.

5. The catalyst measuring system as claimed in claim 1, wherein the electronic control device compares the measured data of the NOx sensor and the high-frequency sensor at a previous dosing rate and a current dosing rate.

6. The catalyst measuring system as claimed in claim 1, wherein the electronic control device determines the highest possible dosing rate in an iterative method.

7. The catalyst measuring system as claimed in claim 1, wherein the high-frequency measuring arrangement measures the resonance frequency of the SCR catalytic converter.

8. The catalyst measuring system as claimed in claim 1, wherein the high-frequency measuring arrangement measures the dielectric losses in the SCR catalytic converter.

9. The catalyst measuring system as claimed in claim 1, wherein the electronic control device determines the state of aging of the SCR catalytic converter based on at least one of the measured NOx concentration or the measured ammonia loading.

10. A vehicle comprising:
    a combustion chamber;
    a tract for exhaust gas leaving the combustion chamber;
    a SCR catalytic converter for purifying the exhaust gas;
    an electronic control device for operating the catalyst measuring system and evaluating the measurement data;
    a high-frequency sensor for determining ammonia loading of the SCR catalytic converter;
    a NOx sensor for sensing the NOx concentration downstream of the SCR catalytic converter; and
    an ammonia dosing system for injecting ammonia into an exhaust system of the vehicle;
    wherein the electronic control device instructs the ammonia dosing system to inject ammonia selectively into the exhaust system at a plurality of different dosing rates; and
    the electronic control device evaluates data received from the NOx sensor and of the high-frequency sensor to calculate a highest possible dosing rate of ammonia which brings about a greatest possible reduction in the NOx concentration in the exhaust gas without ammonia being deposited in the SCR catalytic converter.

11. A vehicle comprising:
    a combustion chamber;
    an tract for exhaust gas leaving the combustion chamber;
    an SCR catalytic converter for purifying the exhaust gas;
    an electronic control device for operating the catalyst measuring system and evaluating the measurement data;
    a high-frequency sensor for determining ammonia loading of the SCR catalytic converter;
    a NOx sensor for sensing the NOx concentration downstream of the SCR catalytic converter; and
    an ammonia dosing system for injecting ammonia into an exhaust system of the vehicle;
    wherein the electronic control device instructs the ammonia dosing system to inject ammonia selectively into the exhaust system at a plurality of different dosing rates; and
    the electronic control device evaluates data received from the NOx sensor and of the high-frequency sensor to calculate a highest possible dosing rate of ammonia which brings about a greatest possible reduction in the NOx concentration in the exhaust gas with the result that only a minimal amount of ammonia is deposited in the SCR catalytic converter.

12. A method for on-board diagnostics and for determining the state of aging of an SCR catalytic converter, the method comprising:
  determining the NOx concentration during dosed ammonia injection of an SCR catalytic converter as a reference;
  initializing the measurement by operating the SCR catalytic converter at a constant operating point without ammonia injection, with the result that no or very little ammonia is stored in the SCR catalytic converter;
  injecting ammonia into the exhaust system according to a defined dosing rate;
  measuring the NOx concentration downstream of the SCR catalytic converter and the ammonia loading of the SCR catalytic converter;
  determining the highest possible ammonia dosing rate at which the NOx concentration downstream of the SCR catalytic converter becomes minimal without ammonia loading occurring, or with only minimal ammonia loading occurring, in the SCR catalytic converter; and
  determining the state of aging of the SCR catalytic converter based on the highest possible dosing rate.

13. A non-transitory computer-readable medium storing instructions for on-board diagnostics and for determining the state of aging of an SCR catalytic converter, the instructions when executed by a processor, causing the processor to:
  determine the NOx concentration during dosed ammonia injection of an SCR catalytic converter as a reference;
  initialize the measurement by operating the SCR catalytic converter at a constant operating point without ammonia injection, with the result that no or very little ammonia is stored in the SCR catalytic converter;
  inject ammonia into the exhaust system according to a defined dosing rate;
  measure the NOx concentration downstream of the SCR catalytic converter and the ammonia loading of the SCR catalytic converter;
  determine the highest possible ammonia dosing rate at which the NOx concentration downstream of the SCR catalytic converter becomes minimal without ammonia loading occurring, or with only minimal ammonia loading occurring, in the SCR catalytic converter; and
  determine the state of aging of the SCR catalytic converter based on the highest possible dosing rate.

* * * * *